United States Patent
Gangwar et al.

(10) Patent No.: US 9,477,280 B1
(45) Date of Patent: Oct. 25, 2016

(54) SPECIFICATION FOR AUTOMATIC POWER MANAGEMENT OF NETWORK-ON-CHIP AND SYSTEM-ON-CHIP

(71) Applicant: NetSpeed Systems, San Jose, CA (US)

(72) Inventors: Anup Gangwar, Bangalore (IN); Vishnu Mohan Pusuluri, Bangalore (IN); Poonacha Kongetira, Saratoga, CA (US); Sailesh Kumar, San Jose, CA (US)

(73) Assignee: NETSPEED SYSTEMS, San Jose, CA (US)

( * ) Notice: Subject to any disclaimer, the term of this patent is extended or adjusted under 35 U.S.C. 154(b) by 118 days.

(21) Appl. No.: 14/495,689

(22) Filed: Sep. 24, 2014

(51) Int. Cl.
| G06F 1/00 | (2006.01) |
| G06F 1/26 | (2006.01) |
| G06F 17/50 | (2006.01) |
| G06F 15/78 | (2006.01) |

(52) U.S. Cl.
CPC ............ G06F 1/26 (2013.01); *G06F 15/7807* (2013.01); *G06F 15/7825* (2013.01); *G06F 17/50* (2013.01); *G06F 17/5022* (2013.01); *G06F 17/5027* (2013.01); *G06F 17/5045* (2013.01); *G06F 17/5054* (2013.01); *G06F 17/5072* (2013.01)

(58) Field of Classification Search
CPC ........... G06F 17/5054; G06F 15/7825; G06F 17/5022; G06F 17/5027; G06F 17/5045; G06F 17/5072; G06F 15/7807; G06F 17/50
See application file for complete search history.

(56) References Cited

U.S. PATENT DOCUMENTS

| 5,432,785 | A | 7/1995 | Ahmed et al. |
| 5,764,740 | A | 6/1998 | Holender |
| 5,991,308 | A | 11/1999 | Fuhrmann et al. |
| 6,003,029 | A | 12/1999 | Agrawal et al. |
| 6,249,902 | B1 | 6/2001 | Igusa et al. |
| 6,415,282 | B1 | 7/2002 | Mukherjea et al. |
| 6,925,627 | B1 | 8/2005 | Longway et al. |
| 7,065,730 | B2 | 6/2006 | Alpert et al. |
| 7,318,214 | B1 | 1/2008 | Prasad et al. |
| 7,590,959 | B2 | 9/2009 | Tanaka |
| 7,725,859 | B1 | 5/2010 | Lenahan et al. |

(Continued)

FOREIGN PATENT DOCUMENTS

| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Xuxing Chen
(74) *Attorney, Agent, or Firm* — Procopio, Cory, Hargreaves & Savitch LLP

(57) ABSTRACT

Example implementations described herein are directed to the generation of a specification for automatic power management of a network on chip and/or a system on chip. Such example implementations can include automatically generating a specification comprising at least one of a power domain, an always-on indicator, a voltage domain, a voltage level, and a clock frequency for each of one or more agents of a System on Chip (SoC) and a Network on Chip (NoC), the voltage domain indicative of power supply of the each agent, and the power domain indicative of one or more power switch rules applied to the each agent.

20 Claims, 12 Drawing Sheets

(56) References Cited

U.S. PATENT DOCUMENTS

| | | | |
|---|---|---|---|
| 7,808,968 B1 | 10/2010 | Kalmanek, Jr. et al. | |
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedle et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2002/0133792 A1* | 9/2002 | Raghunathan | G06F 17/5022 716/109 |
| 2004/0216072 A1 | 10/2004 | Alpert et al. | |
| 2005/0147081 A1 | 7/2005 | Acharya et al. | |
| 2006/0058994 A1* | 3/2006 | Ravi | G06F 17/5022 703/23 |
| 2006/0161875 A1 | 7/2006 | Rhee | |
| 2006/0268909 A1 | 11/2006 | Langevin et al. | |
| 2007/0088537 A1 | 4/2007 | Lertora et al. | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0089725 A1* | 4/2009 | Khan | G01R 31/31721 716/106 |
| 2009/0268677 A1 | 10/2009 | Chou et al. | |
| 2009/0271167 A1* | 10/2009 | Zhu | G06F 17/5027 703/14 |
| 2009/0313592 A1 | 12/2009 | Murali et al. | |
| 2010/0040162 A1 | 2/2010 | Suehiro | |
| 2011/0022754 A1 | 1/2011 | Cidon et al. | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0099475 A1 | 4/2012 | Tokuoka | |
| 2012/0110541 A1 | 5/2012 | Ge et al. | |
| 2012/0155250 A1 | 6/2012 | Carney et al. | |
| 2012/0311512 A1* | 12/2012 | Michel | G06F 17/5031 716/104 |
| 2013/0028090 A1 | 1/2013 | Yamaguchi et al. | |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |
| 2015/0109024 A1* | 4/2015 | Abdelfattah | H03K 19/01758 326/41 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, F, et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-Noc: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA Memo 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

International Search Report and Written Opinion for PCT/US2014/023625, Jul. 10, 2014, 9 pgs.

* cited by examiner

SPECIFICATION FOR AUTOMATIC POWER MANAGEMENT OF NETWORK-ON-CHIP AND SYSTEM-ON-CHIP

BACKGROUND

1. Technical Field

Methods and example implementations described herein are directed to an interconnect architecture, and more specifically, to incorporation of an input specification for automatic design of power management of a Network-on-Chip (NoC) and a System-on-Chip (SoC).

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components, which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs).

VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node. The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

SUMMARY

Aspects of the present application are directed to a method, system, and non-transitory computer readable medium for incorporating/generating specification(s) that can be used for automatic and dynamic power management of SoC/NoC hardware elements. According to one example implementation, although the present disclosure is being explained with reference to a design of power management of NoC elements, one should appreciate that same architecture/structure/design of power management can be incorporated for SoC element as well.

In an aspect, the present disclosure is configured to automatically define power management of one or more NoC hardware elements based on an input specification, wherein the automatic power management can enable the NoC to conduct any or a combination of: assign power domain and voltage domain to each desired NoC element, enable adjustment of power profile of each NoC element, define power sequence for switching between power profiles, generation additional information to enable further power optimization and/or analysis of NoC design, conduct simulation and verification to arrive at the moment optimal power management architecture for the NoC, along with taking other like actions. According to one example implementation, any other aspect of power management that needs to be configured for one or more NoC/SoC hardware elements is well within the scope of the present disclosure.

In another aspect, in order to automatically design power management for SoC/NoC elements, an input specification having traffic description of SoC/NoC elements, power attributes of one or more NoC/SoC elements, power profiles, among other power management defining attributes need to be configured.

In an aspect of the present disclosure, input specification can include, but is not limited to, power domain (PD)/voltage domain (VD) of all power-consuming hardware elements/agents that are connected to the NoC. Voltage domain (VD) information can be configured to indicate set of power supplies of a hardware agent and optionally can also indicate the nominal voltage levels under various operating conditions. Power domain (PD) information, on the other hand, can be configured to indicate one or more power switch rules that can be applied to a set of hardware agents. Specification of the present disclosure can further include additional information such as if certain NoC hardware elements that form part of one or more PD/VD always need to be ON or OFF.

Specification of the present disclosure can further be configured to include a set of power profiles, wherein a power profile indicates one or more power domains that belong to the profile and need to be ON when the corresponding power profile (PP) is ON. In another aspect, power management generation specification can define desired/optimal relationship between one or more VDs and PDs, along with indicating voltage levels of one or more VDs. Specification of the present disclosure can also define one or more defined or implicit constraints on physical position, design, or span of one or more PDs/VDs so as to indicate PDs/VDs that need to be located together or within a defined space/position.

In another aspect, specification of the present disclosure can define clock/reset attributes of one or more NoC elements. Specification can further include, but is not limited to, connectivity between hardware elements/agents as to how the elements communicate with each other. Such connectivity can also help understand and further define traffic transactions between elements, which can help understand hosts/agents that communicate with each other, frequency/periodicity/volume/characteristics of communication, along with the route information that each NoC element participates in. Specification can further include the power switching sequence indicating the NoC elements that need to go down prior to other NoC elements to allow smooth and optimal power transition and avoid packet data/flit/communication loss.

In yet another aspect, specification can incorporate NoC design, system protocol information being followed, and format (such as .cpf or .upf) of files to be generated for automatic power management. Input specification can further include information on hardware states that must be preserved and/or saved and/or restored during power transitions (idle to busy or visa-versa). Information on number/type/mode of isolation cells and level shifters being required during power/voltage domain transition can also be incorporated as part of the input specification for automatic generation of the power management for the NoC hardware element.

DETAILED DESCRIPTION

Figure 1A:
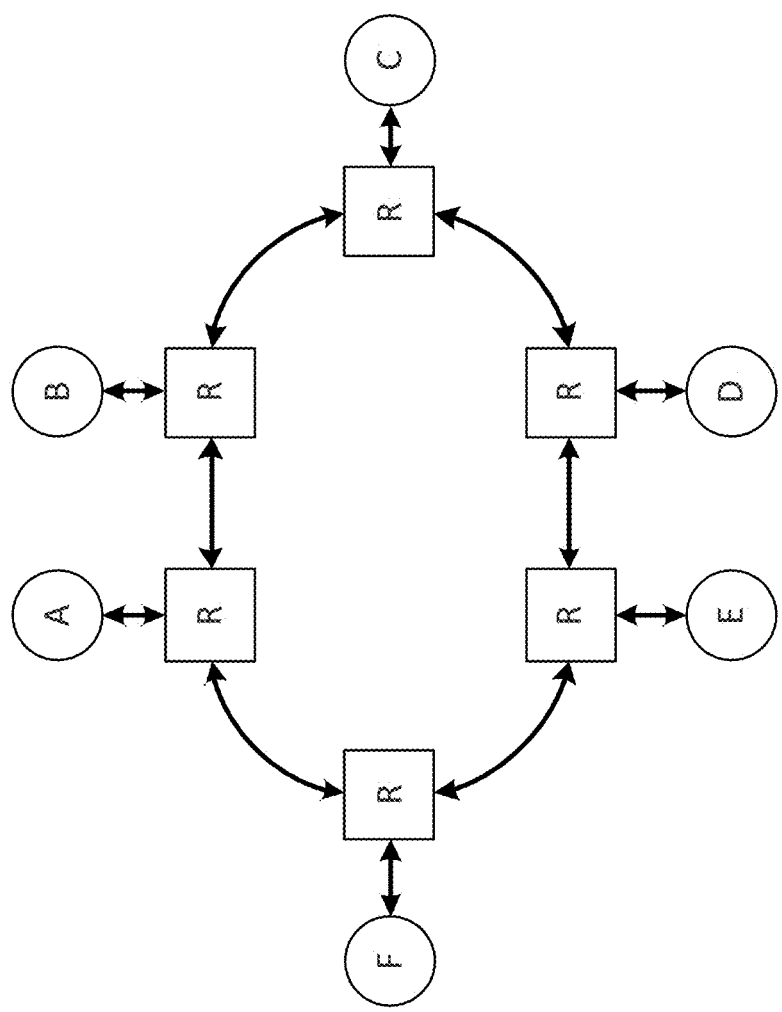
FIGS. 1(a), 1(b), 1(c) and 1(d) illustrate examples of Bidirectional ring, 2D Mesh, 2D Torus, and 3D Mesh NoC Topologies.
Figure 1B:
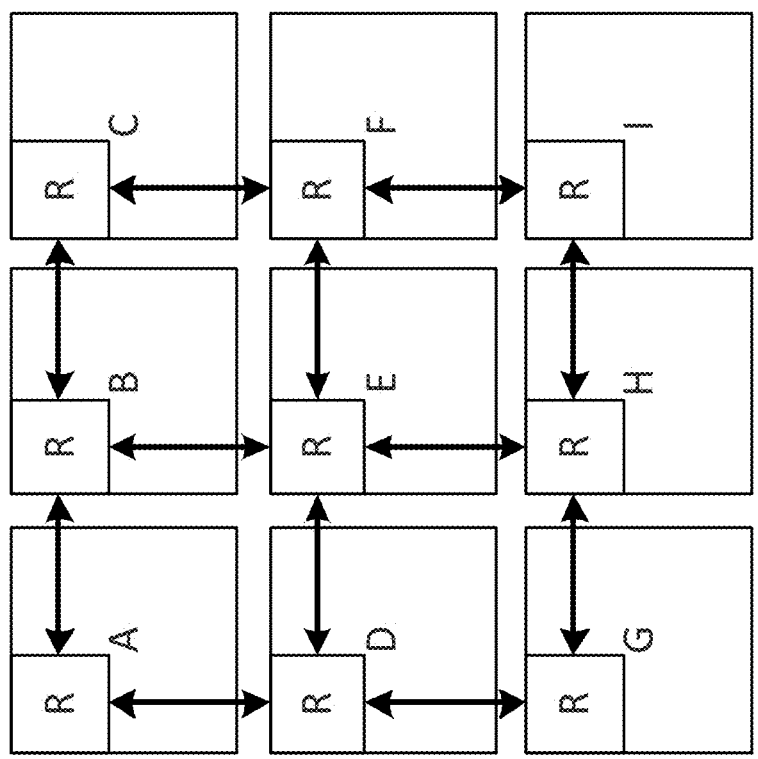
Figure 1C:
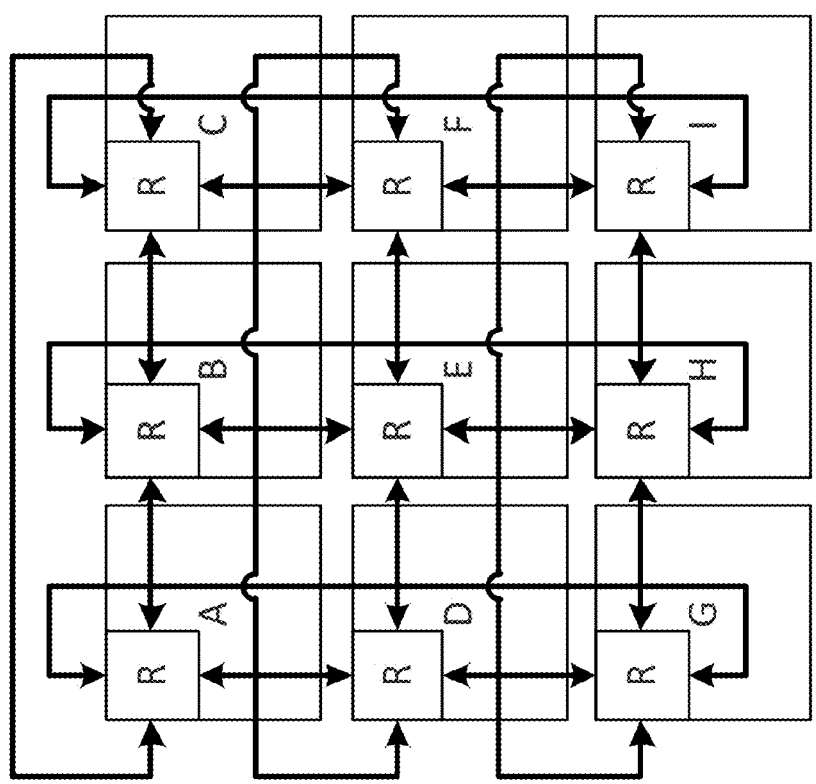
Figure 1D:
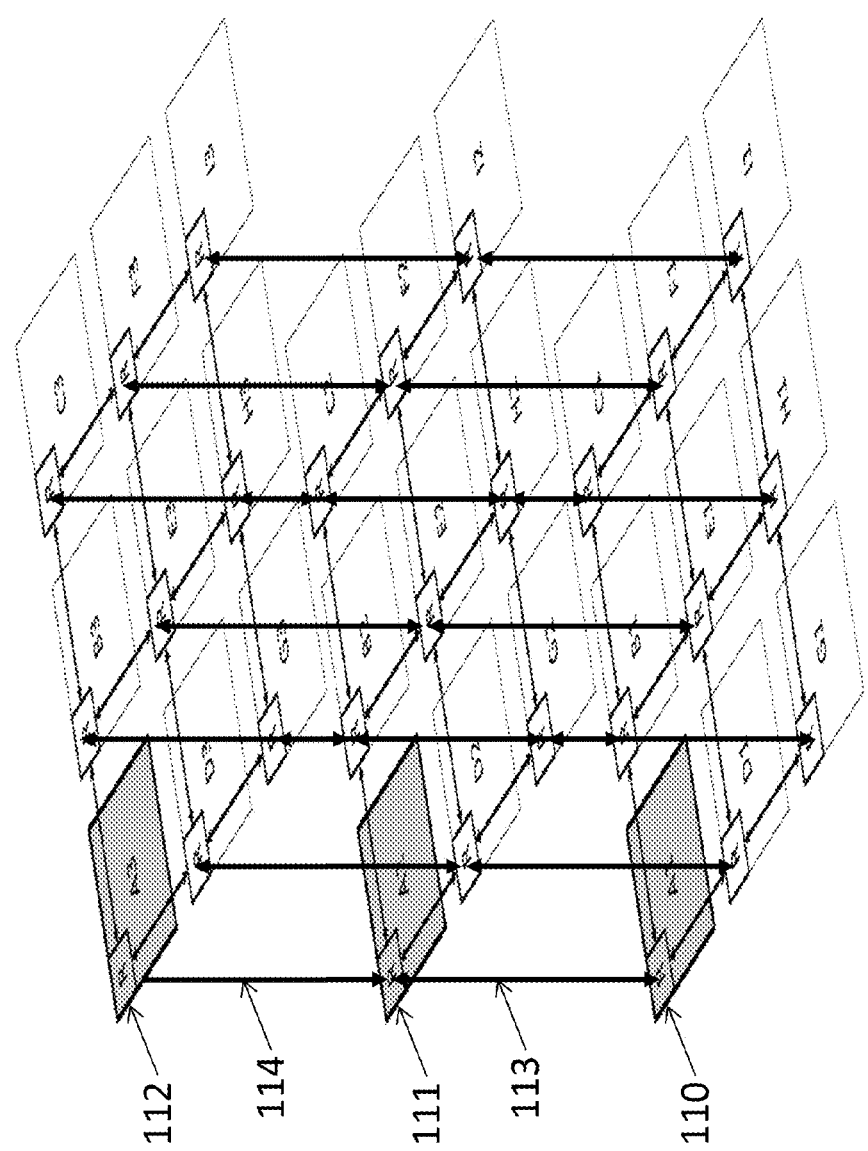
Figure 2A:
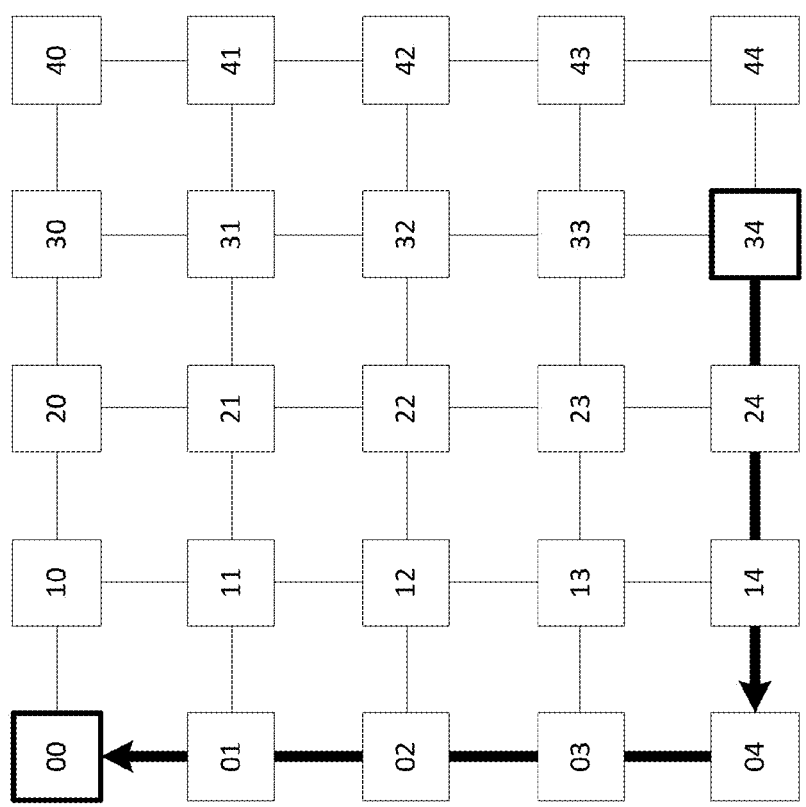
FIG. 2(a) illustrates an example of XY routing in a related art two dimensional mesh.
Figure 2B:
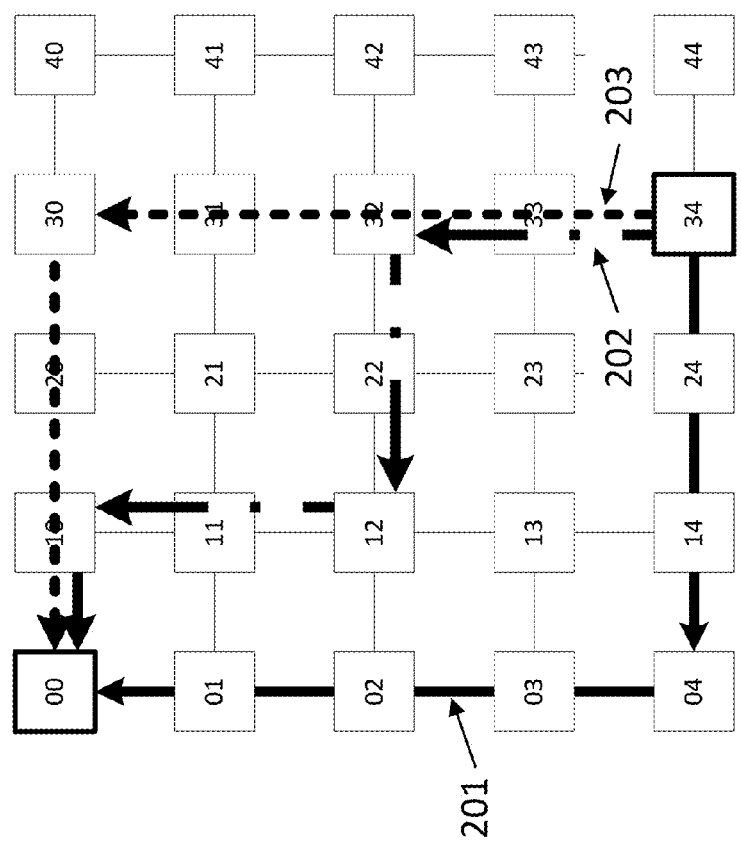
FIG. 2(b) illustrates three different routes between a source and destination nodes.
Figure 3A:
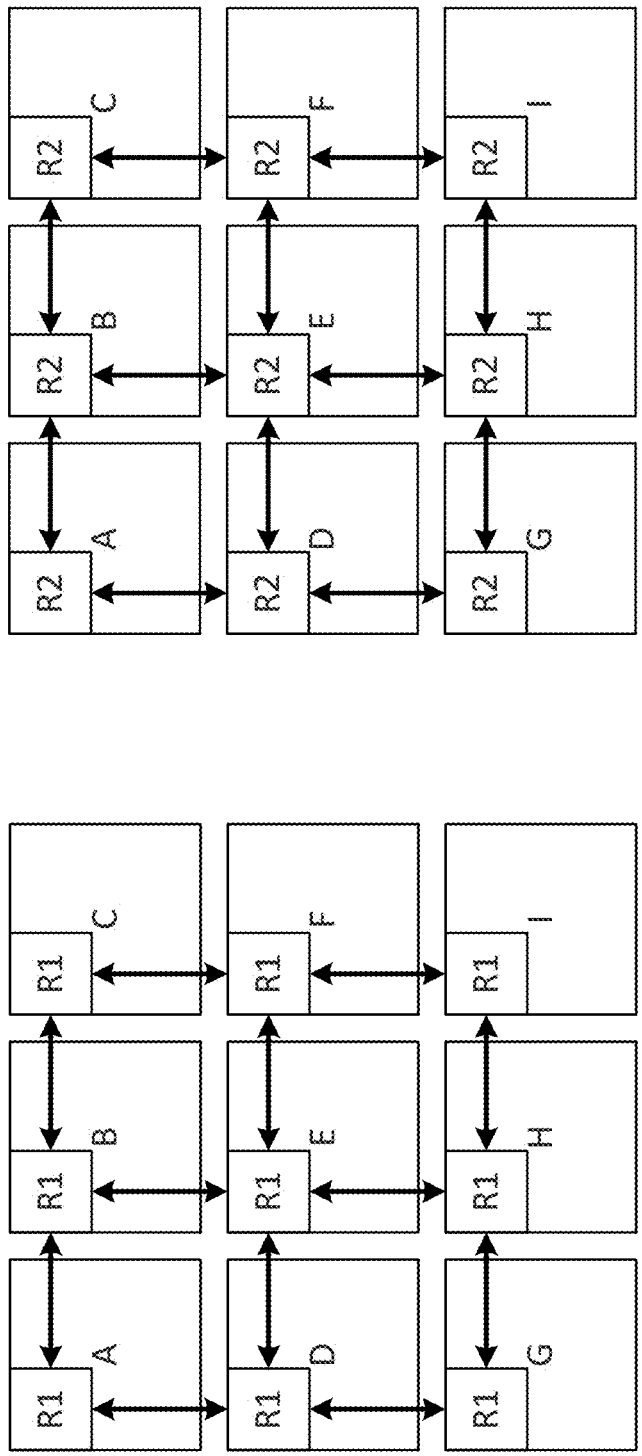
FIG. 3(a) illustrates an example of a related art two layer NoC interconnect.
Figure 3B:
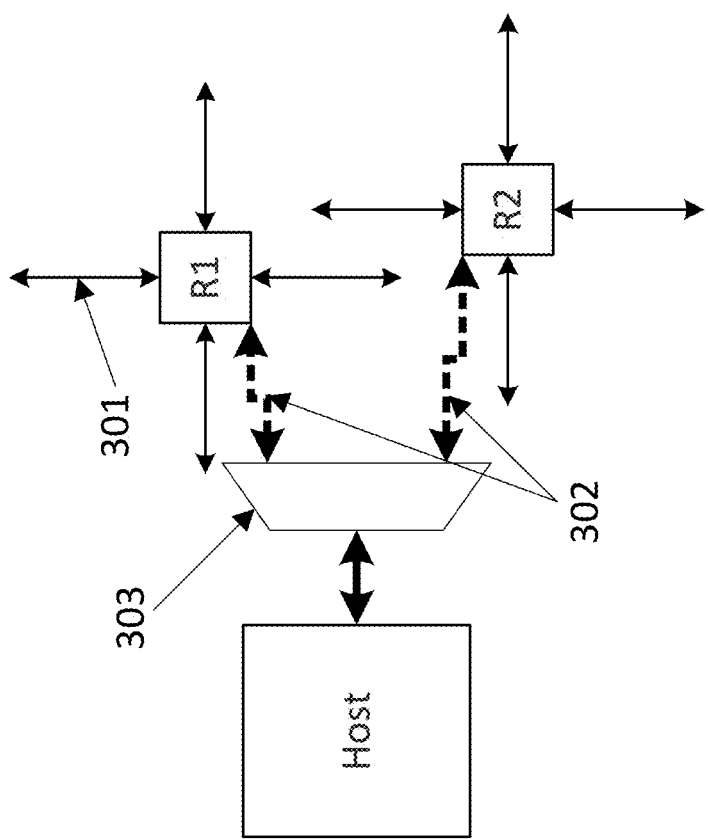
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing implementations of the present application.

As the numbers of on chip components are growing and different heterogeneous subsystems having different frequency and voltage requirements are placed on chip, efficient and low overhead power management has become more difficult. Each heterogeneous resource and subsystem typically has its own power management (PM) protocol, generally developed on an ad-hoc basis and lacking any standard signaling mechanisms. There have been several attempts in past to provide efficient and low overhead power management. Some of the related art systems for power management are typically hardware/software implemented with limited configurability. Power management of these individual components on chip, or subsystem on chip or system on chip, requires one or more components to change their power state and switch from one power profile to another power profile based on certain instructions.

A typical SoC or NoC can be designed and optimized for better power performance for a set of power profiles. The power profile of SoC is representative of the state of SoC where different components of SoC can be in different power states and assigned different voltage and clock frequencies. SoCs can be configured to operate and support varying power profiles, and can be configured to change from one power profile to another based on the function intended to be performed by the SoC. When the SoCs change from one power profile to another, a number of on-chip components/ network elements/agents can change their power state, for example, they can go ON/OFF or change the voltage and power domains. Automatic and dynamic power management and optimization requires a series of input details such as traffic profile, power domain information, voltage domain information, clock frequency, interdependencies of components, retention requirement information, SoC design, NoC design, circuit limitation and other input details describing the state of one or components on chips. The SoCs may further requires a specification that provide the present state of one or more component and contains instructions to be executed by SoC. There is no implementation in the related art that provides or discloses any such specification that contains all these information that can be used for automatic and dynamic power management. Therefore, there is need for a system, method, and architecture for generating/incorporating specification(s) that can describe, power and traffic attributes/parameters of SoC/NoC hardware elements, along with state of one or more components/elements, and instruction to be used by these components for automatic and dynamic power management of SoC/NoC hardware elements to provide efficient and safe working of the SoC/NoC elements.

Aspects of the present application are directed to a method, system, and non-transitory computer readable medium for incorporating/generating specification(s) that can be used for automatic and dynamic power management of SoC/NoC hardware elements. According to one example implementation, although the present disclosure is being explained with reference to design of power management of NoC elements, one should appreciate that same architecture/structure/design of power management can be incorporated for SoC element as well.

In an aspect, the present disclosure is configured to automatically define power management of one or more NoC hardware elements based on an input specification, wherein the automatic power management can enable the NoC to conduct any or a combination of: assign power domain and voltage domain to each desired NoC element, enable adjustment of power profile of each NoC element, define power sequence for switching between power profiles, generation additional information to enable further power optimization and/or analysis of NoC design, conduct simulation and verification to arrive at the moment optimal power management architecture for the NoC, along with taking other like actions. According to one example implementation, any other aspect of power management that needs to be configured for one or more NoC/SoC hardware elements is well within the scope of the present disclosure.

In another aspect, in order to automatically design power management for SoC/NoC elements, an input specification having traffic description of SoC/NoC elements, power attributes of one or more NoC/SoC elements, power profiles, among other power management defining attributes need to be configured.

In an aspect of the present disclosure, input specification can include, but is not limited to, in any manner, power domain (PD)/voltage domain (VD) of all power-consuming hardware elements/agents that are connected to the NoC. Voltage domain (VD) information can be configured to indicate set of power supplies of a hardware agent and optionally can also indicate the nominal voltage levels under various operating conditions. Power domain (PD) information, on the other hand, can be configured to indicate one or more power switch rules that can be applied to a set of hardware agents. Specification of the present disclosure can further include additional information such as if certain NoC hardware elements that form part of one or more PD/VD always need to be ON or OFF.

Specification of the present disclosure can further be configured to include a set of power profiles, wherein a power profile indicates one or more power domains that belong to the profile and need to be ON when the corresponding power profile (PP) is ON. In another aspect, power management generation specification can define desired/optimal relationship between one or more VDs and PDs, along with indicating voltage levels of one or more VDs. Specification of the present disclosure can also define one or more defined or implicit constraints on physical position, design, or span of one or more PDs/VDs so as to indicate PDs/VDs that need to be located together or within a defined space/position.

In another aspect, specification of the present disclosure can define clock/reset attributes of one or more NoC elements. Specification can further include, but is not limited to, connectivity between hardware elements/agents as to how the elements communicate with each other. Such connectivity can also help understand and further define traffic transactions between elements, which can help understand hosts/agents that communicate with each other, frequency/periodicity/volume/characteristics of communication, along with the route information that each NoC element participates in. Specification can further include the power switching sequence indicating the NoC elements that need to go down prior to other NoC elements to allow smooth and optimal power transition and avoid packet data/flit/communication loss.

In yet another aspect, specification can incorporate NoC design, system protocol information being followed, and format (such as .cpf or .upf) of files to be generated for automatic power management. Input specification can further include information on hardware states that must be preserved and/or saved and/or restored during power transitions (idle to busy or visa-versa). Information on number/type/mode of isolation cells and level shifters being required during power/voltage domain transition can also be incorporated as part of the input specification for automatic generation of the power management for the NoC hardware element.

Figure 4:
FIG. 4 illustrates an example representation showing automatic design of power management for NoC elements based on an input specification in accordance with an example implementation of the present disclosure.

FIG. 4 illustrates an example representation 400 showing automatic design of power management 450 for NoC elements based on an input specification 402 in accordance with an example implementation of the present disclosure. One should appreciate that although the input specification 402 is shown to a defined number of parameters, any number of additional parameters is well within the scope of the present disclosure.

According to one example implementation, specification 402, at block 404, can be configured to include and/or define power domain (PD) and voltage domain (VD) of one or more power-consuming hardware elements that are connected into/with the NoC. Based on such defined PD/VD information along with other information as would be explained subsequently, PD/VD can be assigned to NoC elements automatically as shown in block 452. VD can indicate a set of power supplies of a hardware element and optionally can also include nominal voltage levels under various operating conditions. Power domain (PD), on the other hand, can include one or more power switching rules that can be applied to a set of hardware agents.

Specification 402 of the present disclosure, at block 406, can further be configured to define one or more power profiles, each profile indicative of power domains that are ON when the profile is active. Therefore each power profile (PP) is a collection of all ON power domains, wherein power profile definition/configuration can be configured to enable adjustment of power profile based on PD/VD assignment to each NoC element, as shown in block 454.

According to another example implementation, input specification 402 can be configured to, in block 408, optionally define relationship between PD and VD such as configuration of each VD with respect to one or more PDs and visa-versa. For instance, specification 402 can define a condition wherein each VD can include multiple PDs and each PD must belong to only one VD. Another such condition can state that a given PD may belong to multiple VDs. Similarly, another condition can state that if a VD is ON/OFF, then all its PDs are also ON/OFF. Yet another condition can allow a PD to be ON when at least one of its VD is ON, and OFF when all is VDs are OFF.

In another example implementation, specification 402, at block 410, can be configured to define voltage levels of one or more VD's. Definition of voltage levels can also be used for automatic generation of power management profile for NoC/SoC elements along with enabling efficient power optimization design 460. Varying voltage levels of 410 can also help in conducting simulation and verification of one or more NoC power management configurations to help arrive at an optimal design. In an aspect, instead of defining voltage levels of VDs, even a function describing the voltage levels of each VD can be incorporated. Such a function can also be based on one or more runtime conditions and/or can be controlled by a software.

According to another example implementation, specification 402 of the present disclosure can, through block 412, include one or more constraints that define how power profile adjustment (454) and/or PD/VD assignment (452) can be performed. Such constraints can be physical constraints that can define how one or more PDs/VDs can be physically located/positioned/designed. For instance, VDs and their corresponding PDs that need to be located together as neighbors or within a defined physical proximity of each other can be identified and configured so that the constraints are fulfilled during automatic power management. Such constraints can be controlled internally and/or externally and predefined or even defined at run-time if required. Such constraints can also enable/lead to efficient power sequencing for switching between one or more power profiles. In yet another example implementation, the defined constraints can also define conditions such as whether new PDs/VDs can be created, or the number such PDs/VDs that can be created, or whether neighboring having different PDs/VDs can be allowed. Any other constraint can also be defined as desired. Constraints can also be defined for a part of the NoC instead of being applicable to the whole NoC. Constraints can also be defined for a defined period of time interval.

According to another example implementation, specification 402 can include clock/reset setting to be defined through exemplary block 414, wherein based on clock/reset settings, clock gating and other applicable functions can be implemented. For instance, the clock settings can indicate the number of cycles (post non-receipt of data packets/flits) after which a NoC element has to be switched off/put idle. Any other additional constraints can also be defined in the input specification 402 as shown in block 418, which can be taken into account, while assigning PD/VD or conducting power sequencing operations for further power optimization.

According to one example implementation, specification 402 can further be configured to, at block 418, define connectivity indicative of how one or more hardware elements/agents communicate with each other. For instance, a host may speak with a cache or with a memory or with both and may have a plurality of NoC elements in between the hosts and therefore understanding of connectivity can help understand SoC design, NoC design along with sequence of communication flow from one host to another. At block 420, route information of NoC elements can also be understood for appropriate automatic configuration of power management based on how various NoC elements are connected with each other. Traffic transactions 422 indicative of the type/volume of transactions that take place between hosts can also be taken into account for understanding/identifying routes that are busy or have strong bursts of traffic. Such traffic information enables understanding of NoC elements and routes that need higher bandwidth, need to be ON for longer time periods, have higher than average OFF/ON transition periods, need assignment to PP's having more PDs, among other aspects.

Specification 402 of the present disclosure can further be configured to design means for incorporation of system protocol information 424 for automation generation of power management design 450. System protocol information 424 can define protocols being used/compatible with the proposed NoC interconnect architecture so that the protocol information can be used during power management. NoC design 426 indicative of how each NoC hardware element is connected with the other also needs to be taken into account while assigning PD/VD and implementing power profile adjustment. Desired file format such as .cpf or .upf, which can be compatible with other power management tools can also be incorporated in the specification 402 by means of block 428 during automatic power management design so that the power management configurations/settings can also be read/modified by other compatible/desired tools.

In example implementations involving automatic generation of a specification, the input specification can be generated or harvested by an automated process, and the modules of the system are configured to parse the harvested inputs to automatically generate the output specification related to the NoC or the SoC design. Example input can include the input specification as described with respect to FIG. 4. Some or all of the inputs of the input specification may be derived from the SoC or the NoC (e.g., traffic specification indicative of the traffic flows of the NoC/SoC). In other example implementations, the inputs may be provided through an interface configured to receive inputs from the user. From the input specification, the specification for automatic power management can be automatically generated and incorporated by software or hardware.

From the input specification, the specification for automatic power management can be automatically generated and incorporated by software or hardware. For consumption by hardware, the specification for automatic power management can include a power management sequence that is generated and converted in a format which can directly run on hardware (e.g. binary code). For consumption by software, electronic design automation tools can automatically extract parameters from the specification for automatic power management. The electronic design automation tools can consume and provide some modification to produce a modified version, depending on the desired implementation.

Figure 5:
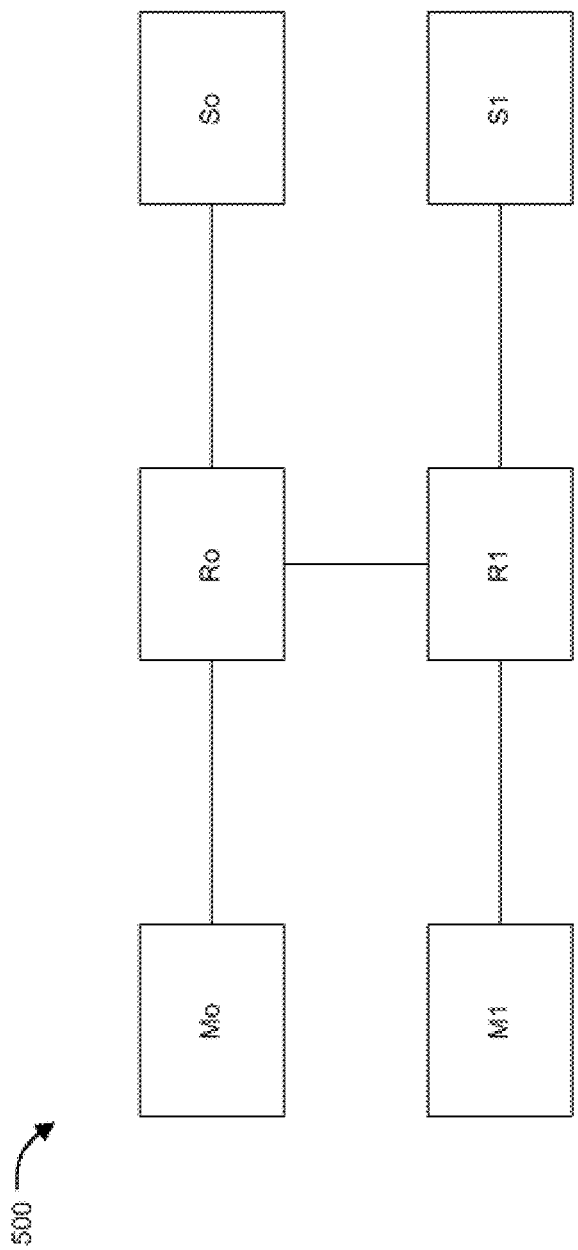
FIG. 5 illustrates an example block diagram showing connectivity between SoC components/elements and NoC agents/elements in accordance with an example implementation of the present disclosure.

Further, aspects of the present disclosure allow one or more of the input specification 402 attributes described above to allow definition of power sequencing for switching between power profiles (as shown in block 456). For instance, based on traffic specification, defined constraints, NoC/SoC design, among other attributes described above and hereinafter, sequence of power down of one or more NoC elements can be defined. With respect to FIG. 5, assuming there are two master hosts M0 and M1 that are operatively connected with two slave hosts S0 and S1 through two routers R0 and R1, each slave S0 or S1 can be switched off only when it has no outstanding transaction from any of the masters. Therefore, for S0 to be switched off, the power management design should be such that S0 should not be switched off until there are no outstanding transactions to S0. Similarly, for M0 and S0 to be switched off, there should be no outstanding transactions to S0 and no outstanding transactions from M0. In order to therefore power off M0, R0, and S0, in an example, first, transmission of any data packet from any master to S0 should be stopped, followed by ensuring that S0 has processed and sent responses to its received packets, followed by powering down of S0, followed by ensuring that M0 has received all its due responses, followed by powering down of M0, and finally powering down of R0.

According to one example implementation, specification 402 can be configured to, through block 430, define such hardware states that need to be preserved. Any other parameters/attributes that can enable generation of additional information to enable further power optimization, analysis or design, as shown in 458, are completely within the scope of the present disclosure. For instance, specification can retrieve information from other hardware elements as to set of steps to power down/up or change voltages and clocks of one or more power domains/voltage domains. Specification 402 can also include settings/constraints on which hardware element is powered down or voltage/clock changed and in which order. Information on one or more constraints relating to powering up/down or NoC/SoC elements/agents, management of PD/VD, changes in power profiles, changes in voltage levels/clocks, can also be retrieved/designed through a software or a combination of hardware and software. Such constraints/design information can also be dynamic in nature, based on which automatic PD/VD can be assigned to one or more NoC elements and/or power profile can be adjusted or power sequence can be managed/implemented.

According to another example implementation, specification 402 can further include definition of number of isolation cells/level shifters that may be required to be implemented in the proposed NoC interconnect architecture.

According to another example implementation, automatic power management can be done such that register states are maintained. In another example implementation, specification 402 can also define how data/power signals between hosts and between host-NoC elements can be managed. For instance, the signals can, in an example implementation, be managed by a local agent/manager and/or by a central manager. Therefore, the power signals can either be managed/controlled by a single central global power manager or by a plurality of local power manager elements, wherein such plurality of local power manager elements can in turn be managed by a central manager.

Figure 6:
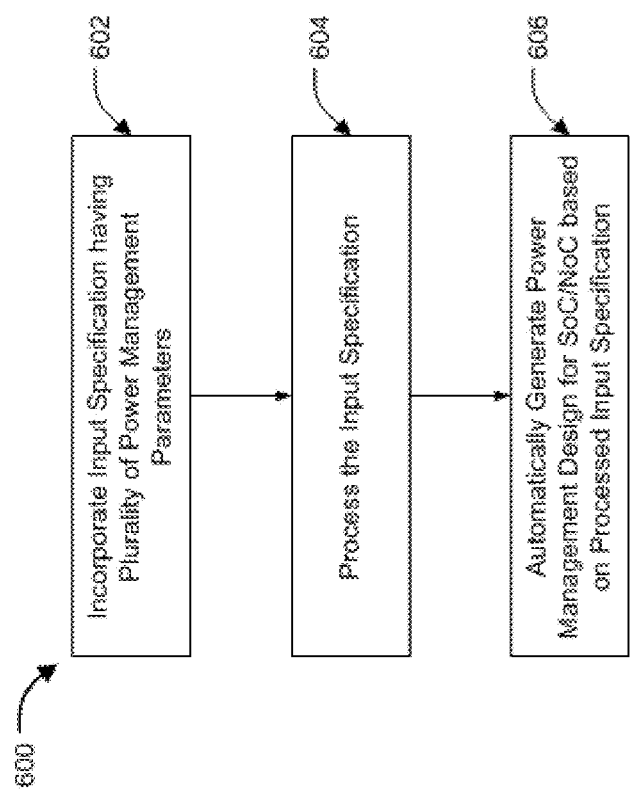
FIG. 6 illustrates an example flow diagram in accordance with an example implementation of the present disclosure.

FIG. 6 illustrates an exemplary flow diagram 600 in accordance with an example implementation of the present disclosure. At step 602, input specification is incorporated, wherein the specification can include, but is not limited to, indication of power domain/voltage domain of one or more hardware elements, power profile, voltage levels, constraints on VD/PD assignment, PD/VD relationship, NoC design, SoC design, traffic specification, connectivity between hardware elements, protocol information, desired power switching sequence(s), among other desired design level features. At step 604, the input specification can be processed to take into consideration one or more features/factors/design attributes/constraints defined in the specification. At step 606, the processed input specification can be configured to enable automatic generation of power management design for the SoC/NoC.

Figure 7:
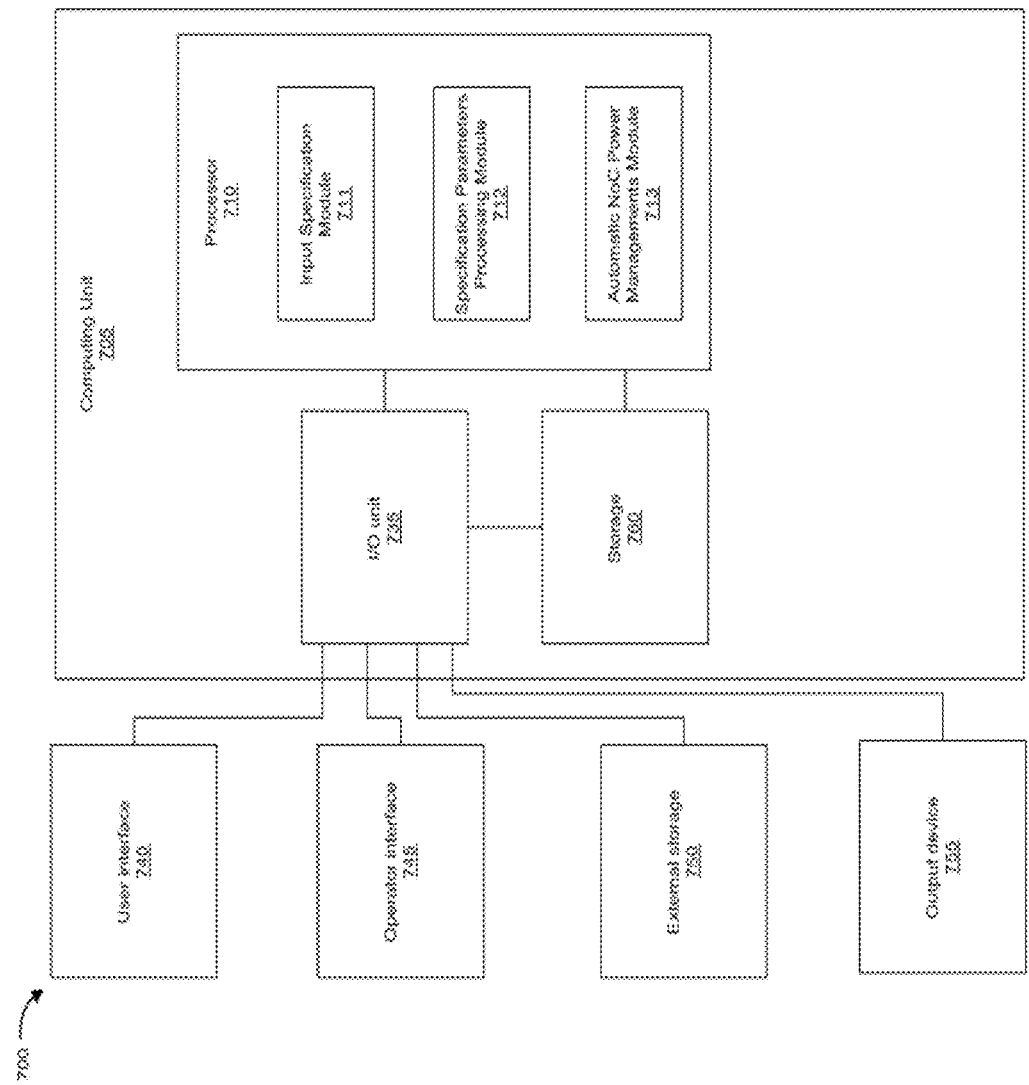
FIG. 7 illustrates an example of computer system on which example implementations can be implemented.

FIG. 7 illustrates an example computer system 700 on which example implementations may be implemented. The computer system 700 includes a server 705 which may involve an I/O unit 735, storage 760, and a processor 710 operable to execute one or more units as known to one of skill in the art. The term "computer-readable medium" as used herein refers to any medium that participates in providing instructions to processor 710 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 740 and operator interfaces 745 which may utilize input devices such as a keyboard, mouse, touch device, or verbal command.

The server 705 may also be connected to an external storage 750, which can contain removable storage such as a portable hard drive, optical media (CD or DVD), disk media or any other medium from which a computer can read executable code. The server may also be connected an output device 755, such as a display to output data and other information to a user, as well as request additional information from a user. The connections from the server 705 to the user interface 740, the operator interface 745, the external storage 750, and the output device 755 may via wireless protocols, such as the 802.11 standards, Bluetooth® or cellular protocols, or via physical transmission media, such as cables or fiber optics. The output device 755 may therefore further act as an input device for interacting with a user.

The processor 710 may execute one or more modules including input specification receipt module 711, a specification parameters processing module 712, and an automatic NoC power management module 713. In an aspect, input specification receipt module 711 can be configured to receive one or more input parameters/constraints/design attributes including, but not limited to, SoC/NoC design, power profile information containing voltage domain information, power domain information and power profile information, traffic flow information, protocol information, defined constraints, voltage level information, relationship between VD/PD, expected hardware state, number of isolation cells/level shifters required, desired file format, system protocol information, route/traffic transaction information, among other like attributes.

According to an example implementation, specification parameters processing module 712 can be configured to process and analyze the input parameters/design attributes on design features that need to be incorporated into the NoC/SoC hardware elements, which analysis can then be used by the automatic NoC power management module 713 to automatically generate power management design for the SoC/NoC hardware elements/agents.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
  automatically generating a specification comprising at least one of a power domain, an always-on indicator, a voltage domain, a voltage level, and a clock frequency for each of one or more agents of a System on Chip (SoC) and a Network on Chip (NoC), the voltage domain indicative of power supply of the each agent, and the power domain indicative of one or more power switch rules applied to the each agent;
  wherein the specification further comprises one or more power profiles, each power profile indicative of a mode of operation of the SoC or the SoC use case and wherein each power profile comprises one or more of: a power and voltage state and a clock frequency of the one or more agents of the SoC and the NoC.

2. The method of claim 1, wherein the one or more power profiles are derived from a traffic profile of the SoC, the traffic profile indicative of which SoC agents are active and intercommunicating in various SoC operating modes.

3. The method of claim 1, wherein the specification further comprises constraints on the one or more of a power state, the voltage level and the clock frequency of the one or more agents of the SoC and the NoC agents when switching between different ones of the one or more power profiles; the constraints configured for use in automatically determining power sequencing rules for the SoC and the NoC to switch between different power profiles.

4. The method of claim 3, wherein the constraints comprise an order for changing the power state, the voltage level and the clock frequency of the one or more agents of the SoC and the NoC agents.

5. The method of claim 3, wherein the constraints comprise one or more dependencies between the one or more of the power state, voltage level and clock frequency of the one or more agents of the SoC and the NoC.

6. The method of claim 1, wherein the specification further comprises information indicative of a relationship between the one or more of the power domain, the voltage domain, and the clock frequency for the SoC and the NoC.

7. The method of claim 1, wherein the voltage domain comprises a voltage level function.

8. The method of claim 7, wherein the voltage level function is based on an operating one of the one or more power profiles of the SoC and the NoC and operating conditions of the SoC.

9. The method of claim 1, wherein the specification further comprises a topology comprising one or more proximity constraints for a placement of the one or more of the power domains and voltage domains and die area restrictions for the power domain and the voltage domain hardware logic associated with the one or more agents of the SoC and the NoC.

10. The method of claim 1, wherein the specification comprises executable instructions configured to be one of a hierarchical file structure and flat file structure.

11. The method of claim 1, further comprising converting the specification into a format suitable for consumption by an electronic design automation tool.

12. A non-transitory computer readable medium storing instructions for executing a process, the instructions comprising:
  automatically generating a specification comprising at least one of a power domain, an always-on indicator, a voltage domain, a voltage level, and a clock frequency for each of one or more agents of a System on Chip (SoC) and a Network on Chip (NoC), the voltage domain indicative of power supply of the each agent, and the power domain indicative of one or more power switch rules applied to the each agent;
  wherein the specification further comprises one or more power profiles, each power profile indicative of a mode of operation of the SoC or the SoC use case and wherein each power profile comprises one or more of: a power and voltage state and a clock frequency of the one or more agents of the SoC and the NoC.

13. The non-transitory computer readable medium of claim 12, wherein the one or more power profiles are derived from a traffic profile of the SoC, the traffic profile indicative of which SoC agents are active and intercommunicating in various SoC operating modes.

14. The non-transitory computer readable medium of claim 12, wherein the specification further comprises constraints on the one or more of a power state, the voltage level and the clock frequency of the one or more agents of the SoC and the NoC agents when switching between different ones of the one or more power profiles; the constraints configured for use in automatically determining power sequencing rules for the SoC and the NoC to switch between different power profiles.

15. The non-transitory computer readable medium of claim 14, wherein the constraints comprise an order for changing the power state, the voltage level and the clock frequency of the one or more agents of the SoC and the NoC agents.

16. The non-transitory computer readable medium of claim 14, wherein the constraints comprise one or more dependencies between the one or more of the power state, voltage level and clock frequency of the one or more agents of the SoC and the NoC.

17. The non-transitory computer readable medium of claim 12, wherein the specification further comprises information indicative of a relationship between the one or more of the power domain, the voltage domain, i and the clock frequency for the SoC and the NoC.

18. The non-transitory computer readable medium of claim 12, wherein the voltage domain comprises a voltage level function.

19. A method, comprising:
processing an input specification comprising a Network on Chip (NoC) design, a System on Chip (SoC) design, one or more power switching sequences for hardware elements of the NoC design and hardware elements of the SoC design, and one or more power profiles to generate a power management design for the SoC design and the NoC design.

20. The method of claim 19, wherein the input specification further comprises isolation cell information for hardware elements of the NoC design.

\* \* \* \* \*